(12) United States Patent
Ishii

(10) Patent No.: US 7,855,939 B2
(45) Date of Patent: Dec. 21, 2010

(54) OPTICAL DISC APPARATUS EMPLOYING AN OBJECTIVE LENS HAVING A HIGH NUMERICAL APERTURE

(75) Inventor: Kazuyoshi Ishii, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 12/773,096

(22) Filed: May 4, 2010

(65) Prior Publication Data
US 2010/0214886 A1 Aug. 26, 2010

Related U.S. Application Data

(62) Division of application No. 11/156,625, filed on Jun. 21, 2005, now Pat. No. 7,729,213.

(30) Foreign Application Priority Data

Jun. 22, 2004 (JP) .............................. 2004-183721

(51) Int. Cl.
G11B 7/00 (2006.01)
(52) U.S. Cl. ................................... 369/44.15
(58) Field of Classification Search .............. 369/44.14, 369/44.15, 44.16, 44.21, 44.22; 359/819, 359/822, 823, 813
See application file for complete search history.

(56) References Cited

U.S. PATENT DOCUMENTS 5,463,501 A 10/1995 Suzuki

| | | | |
|---|---|---|---|
| 6,657,944 B2 | 12/2003 | Mohri et al. | |
| 6,781,946 B2 | 8/2004 | Murata et al. | |
| 7,729,213 B2* | 6/2010 | Ishii | 369/44.15 |
| 2001/0019534 A1 | 9/2001 | Mohri et al. | |
| 2004/0202063 A1* | 10/2004 | Mizuno et al. | 369/44.11 |
| 2006/0233090 A1 | 10/2006 | Ishii | |
| 2007/0047423 A1 | 3/2007 | Ishii | |

FOREIGN PATENT DOCUMENTS

| JP | 5-2765 A | 1/1993 |
|---|---|---|
| JP | 2001-319355 A | 11/2001 |
| JP | 2002-334459 A | 11/2002 |
| JP | 2003-91833 A | 3/2003 |
| JP | 2004-30835 A | 1/2004 |

OTHER PUBLICATIONS

Japanese Office Action dated Jul. 16, 2009, issued in corresponding Japanese patent application No. 2004-183721, with an English translation.

* cited by examiner

*Primary Examiner*—Thang V Tran
(74) *Attorney, Agent, or Firm*—Fitzpatrick, Cella, Harper & Scinto

(57) ABSTRACT

An optical disk apparatus that includes a movable part having an objective lens for focusing a laser beam onto an optical disk. A lens-holding member holds the objective lens. A protecting member prevents contact of the objective lens with the optical disk. An elastic supporting member supports the movable part, and an actuator drives the movable part toward or apart from the optical disk. The apparatus is constructed not to cause contact of the protecting member with the optical disk in a non-working state of the actuator, even when the elastic supporting member is bent by gravity toward the optical disk.

1 Claim, 6 Drawing Sheets

OPTICAL DISC APPARATUS EMPLOYING AN OBJECTIVE LENS HAVING A HIGH NUMERICAL APERTURE

This application is a divisional of U.S. patent application Ser. No. 11/156,625, filed Jun. 21, 2005, and which was published as U.S. patent application publication number 2005/0281148 A1 on Dec. 22, 2005.

This application also claims priority from Japanese Patent Application No. 2004-183721, filed on Jun. 22, 2004, which is hereby incorporated by reference herein.

BACKGROUND OF THE INVENTION

1. Field of the Invention

The present invention relates to a portable optical disk apparatus for recording or reproducing information signals on an optical disk, which employs an objective lens having an NA (numerical aperture) of 0.8 or higher.

2. Related Background Art

Optical disk apparatuses have been commercialized, which record information signals by focusing a laser beam in a fine spot by an objective lens onto an information signal recording layer of an optical disk or reproducing the recorded information signals by the reflected light. Lately, it has become possible to increase the NA of the objective lens of the optical disk apparatus to be 0.08 or higher, as the results of improvement in the design and production technique of the objective lens. Such a high-NA objective lens enables the formation of a finer light spot, to improve the resolution in information recording and reproduction, and to increase the capacity of the optical disk.

Conventionally, a typical optical disk has an information signal recording layer formed on a substrate plate having a thickness of 0.6-1.2 mm, and which is composed of a transparent resin material. The optical disk apparatus projects a laser beam through the substrate plate onto the information signal recording layer. However, an objective lens of a higher NA has a shorter focus length, requiring a shorter distance between the objective lens and the information signal recording layer. This makes it difficult to focus a laser beam through the substrate plate having a thickness of 0.6-1.2 mm on the information signal recording layer. To solve this problem, certain methods have been disclosed. In one method, to meet the increase of the NA of the objective lens, the information signal recording layer is covered on the face reverse to the substrate plate side with a transparent cover layer thinner than the substrate plate, and the laser beam is projected through the cover layer, and not through the substrate plate, as disclosed in Japanese Patent Application Laid-Open Nos. 2003-91833, 2004-30835, and so forth.

FIG. 4 illustrates schematically a constitution of such an optical disk apparatus of the prior art. In FIG. 4, reference numeral 1 denotes an optical disk, reference numeral 2 denotes an optical head, and reference numeral 3 denotes a spindle motor to rotate the optical disk. Optical head 2 is constituted of laser light source 6, collimator lens 7, beam splitter 8, condenser lens 9, photodetector 10, objective lens 20, and actuator 11 for controlling the focusing and tracking with the objective lens 20.

Optical disk 1 is constituted of substrate plate 12, information signal recording layer 13, formed on substrate plate 12 from a phase changeable material capable of changing the reversible phase state, and cover layer 14 having a thickness of about 0.1 mm, which is composed of a transparent resin material. On information signal recording layer 13, recording tracks are formed in spiral or concentric circles. The information signal recording layer 13 may be formed from a magnetooptical material, or a metallic reflecting film having pits (concave areas) formed thereon. Optical head 2 is placed to face cover layer 14 of optical disk 1.

FIG. 5 shows a constitution of actuator 11. Actuator 11 comprises immovable part 15 and movable part 16. Immovable part 15 is constituted of permanent magnets 17a, 17b, yoke 18, and supporting stage 19. Movable part 16 is constituted of objective lens 20, focusing coil 21, tracking coil 22, and lens-holding member 23 for holding the above articles. Elastic supporting members 24a, 24b, 24c, 24d are in a linear shape, and are elastic and highly electroconductive. The supporting members are fixed at the respective ends to supporting stage 19, and hold, at other ends, movable part 16 to be movable freely in vertical and radial directions relative to optical disk 1. Elastic supporting members 24a, 24b, 24c, 24d are also connected electrically to focusing coil 21 and tracking coil 22 on lens-holding member 23.

The optical disk apparatus, as shown in FIG. 4, has an error signal generating circuit 4 and a control circuit 5 for control of focusing and tracking by actuator 11. Control circuit 5 applies electrical control current through elastic supporting members 24a, 24b, 24c, 24d to focusing coil 21 and tracking coil 22.

In recording the information signals, first, optical disk 1 is rotated by spindle motor 3. With the optical disk kept rotated, a laser beam pulse-modulated in accordance with information signals and emitted from laser light source 6 is made parallel by collimator lens 7, allowed to pass beam splitter 8, and focused in a fine spot by objective lens 20 through cover layer 14 of optical disk 1 on information signal recording layer 13.

The information signal recording layer of optical disk 1 is heated and cooled repeatedly by projection of a pulse-modulated laser beam to form recording marks by a phase change to an amorphous phase or a crystal phase by the heating-cooling process.

In reproduction of the recorded information signals, optical disk 1 is rotated similarly by spindle motor 3. With the optical disk being kept rotated, a constant intensity of a laser beam emitted from laser light source 6 is focused in a fine spot through cover layer 14 on information signal recording layer 13. The intensity of the light reflected from information signal recording layer 13 varies in accordance with the recorded marks, whereby the information signal is reproduced.

During the operation of recording and reproducing of the information signals, the light beam reflected by optical disk 1 is further reflected by beam splitter 8, condensed by condenser lens 9, and detected by photodetector 10. Photodetector 10 has a light-receiving face divided into plural sections. Error signal generating circuit 4 generates focus error signals and tracking error signals according to the detected signals at the respective sections of the light-receiving face.

Control circuit 5 applies a control current, based on the focus error signal and the tracking error signal, through elastic supporting members 24a, 24b, 24c, 24d to focusing coil 21 and tracking coil 22. Actuator 11 drives movable part 16 to move perpendicularly toward or away from optical disk 1, or in the radial directions crossing the recording track, by an electromagnetic force generated by an interaction of the control current and the magnetic fluxes of permanent magnets 17a, 17b.

In such a manner, the focusing is controlled to focus precisely the light spot on the recording track to offset perpendicular displacement by axial deflection of a surface of optical disk 1, or a like cause, and the tracking is controlled to scan the recording track by offsetting radial run-out of the track center in the radial direction.

In the above optical disk apparatus, since the gap (working distance) between objective lens 20 and the surface of cover layer 14 is as small as 0.2-0.6 mm, a stopper, or a like mechanism, cannot be provided at a position in the gap, to limit the displacement of movable part 16, to prevent undesired contact of objective lens 20 with optical disk 1. Naturally, the actuator normally working for the control will keep constant the gap between objective lens 20 and the surface of cover layer 14. However, the actuator may fail in the control, owing to an abrupt impact, vibration, or a like cause, or an adverse effect of dirt or a scratch on optical disk 1 so that a normal error signal will not be generated.

In such an abnormal working state, movable part 16 is excessively displaced, inevitably to come into contact with optical disk 1. Even when the contact occurs, at least objective lens 20 can be protected by providing a protrusion higher than objective lens 20 at a portion of lens-holding member 23 facing optical disk 1 and allowing the protrusion to touch optical disk 1.

However, even in a non-working state, especially, with the power source turned off, when the optical disk apparatus is placed with optical disk 1 held horizontally, and with optical head 2 held above the disk, elastic supporting members 24$a$, 24$b$, 24$c$, 24$d$ may be bent by gravity acting on movable part 16, to cause movable part 16 to contact with optical disk 1. This contact state can sometimes be kept for a long time if the optical disk apparatus is left standing.

Usually, lens-holding member 23 and cover layer 14 of optical disk 1 are made from different kinds of resins. The different kinds of resins, which are kept in contact with each other under pressure, are liable to undergo not only usual environmental deterioration, but also, a physical change, such as local deformation and a chemical change, such as chemical deterioration. In particular, the protecting member should have essential properties for productivity (formability) and mechanical properties, such as rigidity, and the cover layer should have optical properties and physical properties, such as hardness. Therefore, physical and chemical durability cannot readily be given additional to the protecting member or the cover layer. The deterioration of optical properties of cover layer 14 caused by deformation or deterioration of the contact portion can presumably prevent normal recording and reproduction of the information signals disadvantageously.

In recent years, optical disk apparatuses are coming to be used as portable apparatuses for recording and reproducing voices, still-pictures, animated pictures, and so forth. The portable apparatuses are stored arbitrarily in various manners by users, and stored in many cases with the optical disk being kept inserted in the apparatus. Accordingly, the optical disk apparatus having the objective lens of a high NA will inevitably encounter the above-mentioned problems.

SUMMARY OF THE INVENTION

The present invention intends to provide an optical disk apparatus which does not cause undesired contact of an objective lens with the optical disk, regardless of the placement state of the optical disk apparatus.

According to an aspect of the present invention, an optical disk apparatus is constituted of a movable part having an objective lens for focusing a laser beam onto an optical disk, a lens-holding member for holding the objective lens, and a protecting member for preventing contact of the objective lens with the optical disk, an elastic supporting member for supporting the movable part, and an actuator for driving the movable part toward or apart from the optical disk, wherein the apparatus is constructed so as not to cause contact of the protecting member with the optical disk in a non-working state of the actuator, even when the elastic supporting member is bent by gravity toward the optical disk.

The optical disk preferably has a recording layer and a transparent cover layer formed on the recording layer, and the protecting member prevents contact of the objective lens with the cover layer.

The apparatus is preferably constituted to satisfy the condition below:

$$S - S_V + S_0 - A > 0,$$

where S denotes a distance between the optical disk and the protecting member with the actuator working, $S_V$ denotes the maximum decrease of the distance between the optical disk and the protecting member by variable factors, $S_0$ denotes a withdrawal distance with the actuator non-working, and A denotes displacement of the protecting member by gravity acting on the movable part.

The optical disk apparatus is preferably portable. The objective lens preferably has an NA not less than 0.8.

According to the present invention, the moving part will not come into contact with the optical disk by bending by gravity (that is, the weight of the movable part) of the elastic supporting member for supporting the movable part toward the optical disk, even when the optical disk is in place during a non-working state, in particular, with the power source turned off, with the optical disk being kept horizontally, and with the optical head kept above the optical disk. Therefore, even if the apparatus is stored for a long time in the above-mentioned state, the contact of the movable part with the optical disk is prevented, so as not to impair the reliability of the apparatus.

DETAILED DESCRIPTION OF THE PREFERRED EMBODIMENTS

The best mode for carrying out the invention is explained below in detail by reference to the drawings. The constitution and operation of the optical disk apparatus of the present invention is similar to the conventional one shown in FIG. 4, so that a detailed explanation thereof is omitted. The present invention relates to optical disk apparatuses, especially, to portable ones, for recording or reproduction of voices, still-pictures, animated pictures, or the like, and assumes the use and storage in an arbitrary placement direction of the apparatus.

Figure 1:
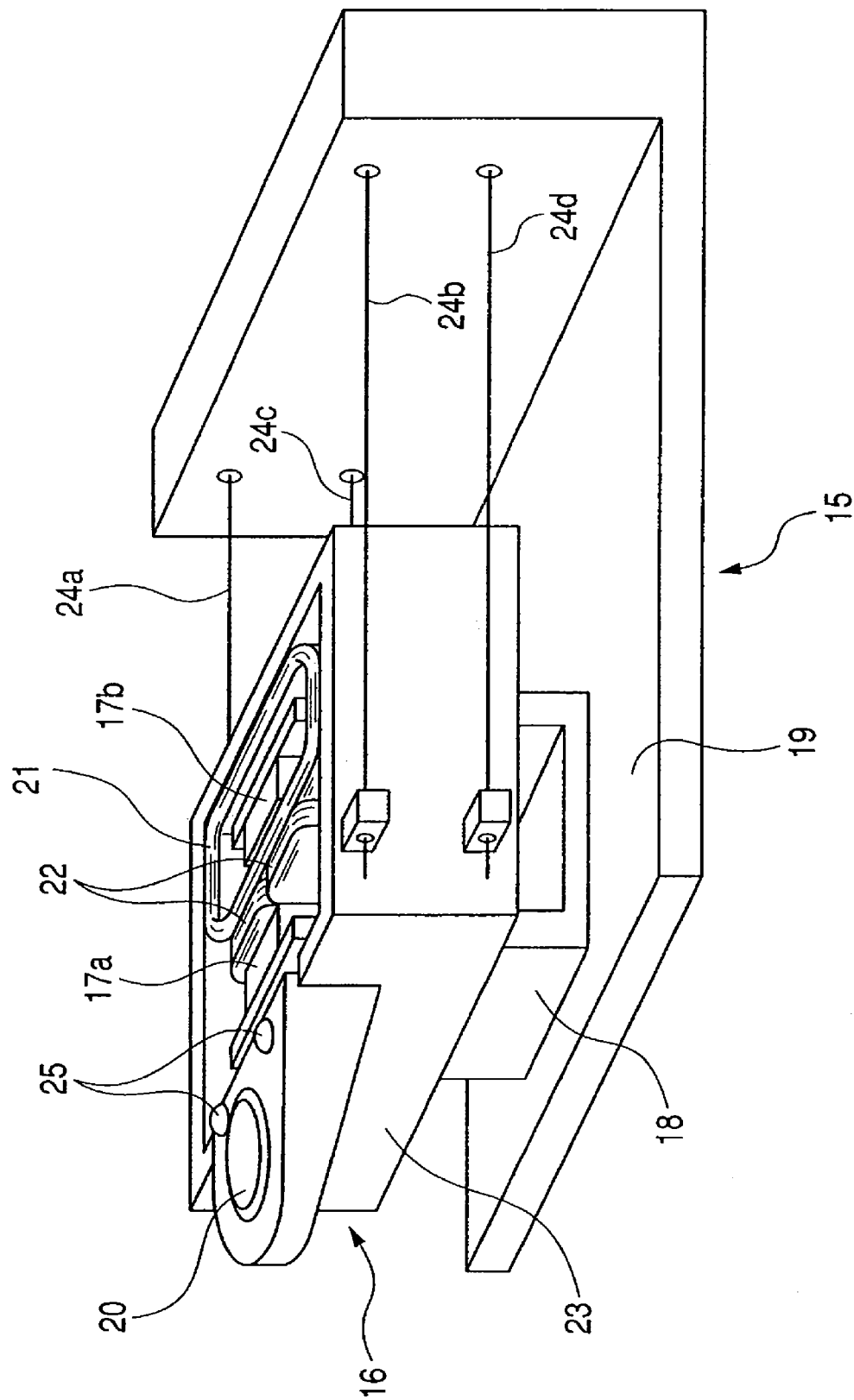
FIG. 1 illustrates a constitution of an actuator of an optical disk apparatus of the present invention.
Figure 5:
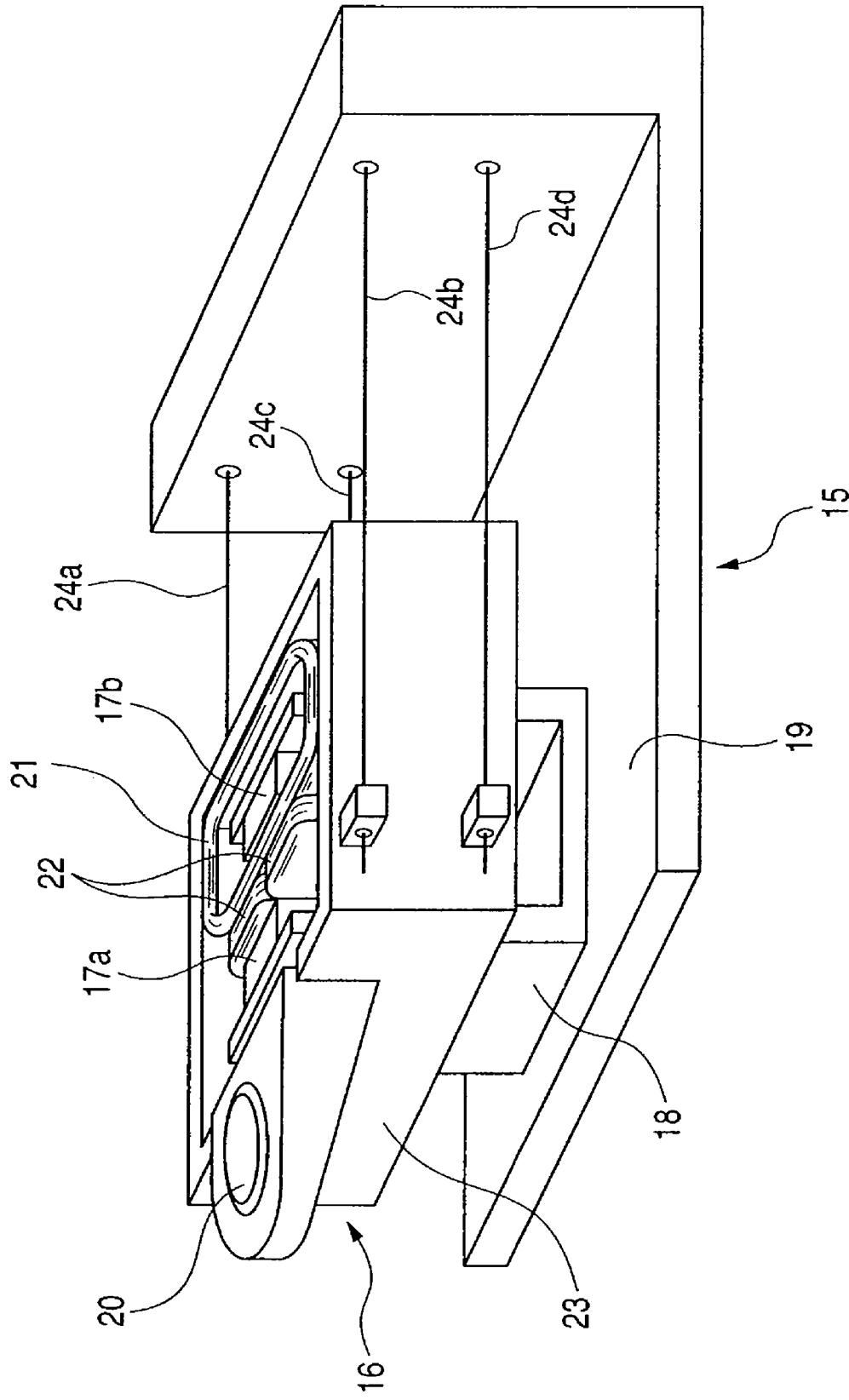
FIG. 5 illustrates a constitution of an actuator of a conventional optical disk apparatus.

Actuator 11 of the optical disk apparatus of the present invention is explained below in detail. FIG. 1 shows a constitution of actuator 11. In FIG. 1, the same symbols as in FIG. 5 are used to denote corresponding members. Actuator 11 comprises immovable part 15 and movable part 16. Immovable part 15 is constituted of permanent magnets 17a, 17b, yoke 18, and supporting stage 19. Movable part 16 is constituted of objective lens 20 having an NA of 0.8 or higher, focusing coil 21, tracking coil 22, and lens-holding member 23 for holding the above articles. Lens-holding member 23 has protecting member 25 protruding a little higher than objective lens 20 toward the optical disk 1. Protecting member 25 may be formed in integration with lens-holding member 23, or may be formed separately and attached later thereto.

Elastic supporting members 24a, 24b, 24c, 24d are in a linear shape, and are elastic and highly electroconductive. The supporting members are fixed at the respective ends to supporting stage 19, and hold, at the other ends, movable part 16 to be movable freely in vertical and radial directions relative to optical disk 1. Elastic supporting members 24a, 24b, 24c, 24d are also connected electrically to focusing coil 21 and tracking coil 22 on lens-holding member 23.

Figure 4:
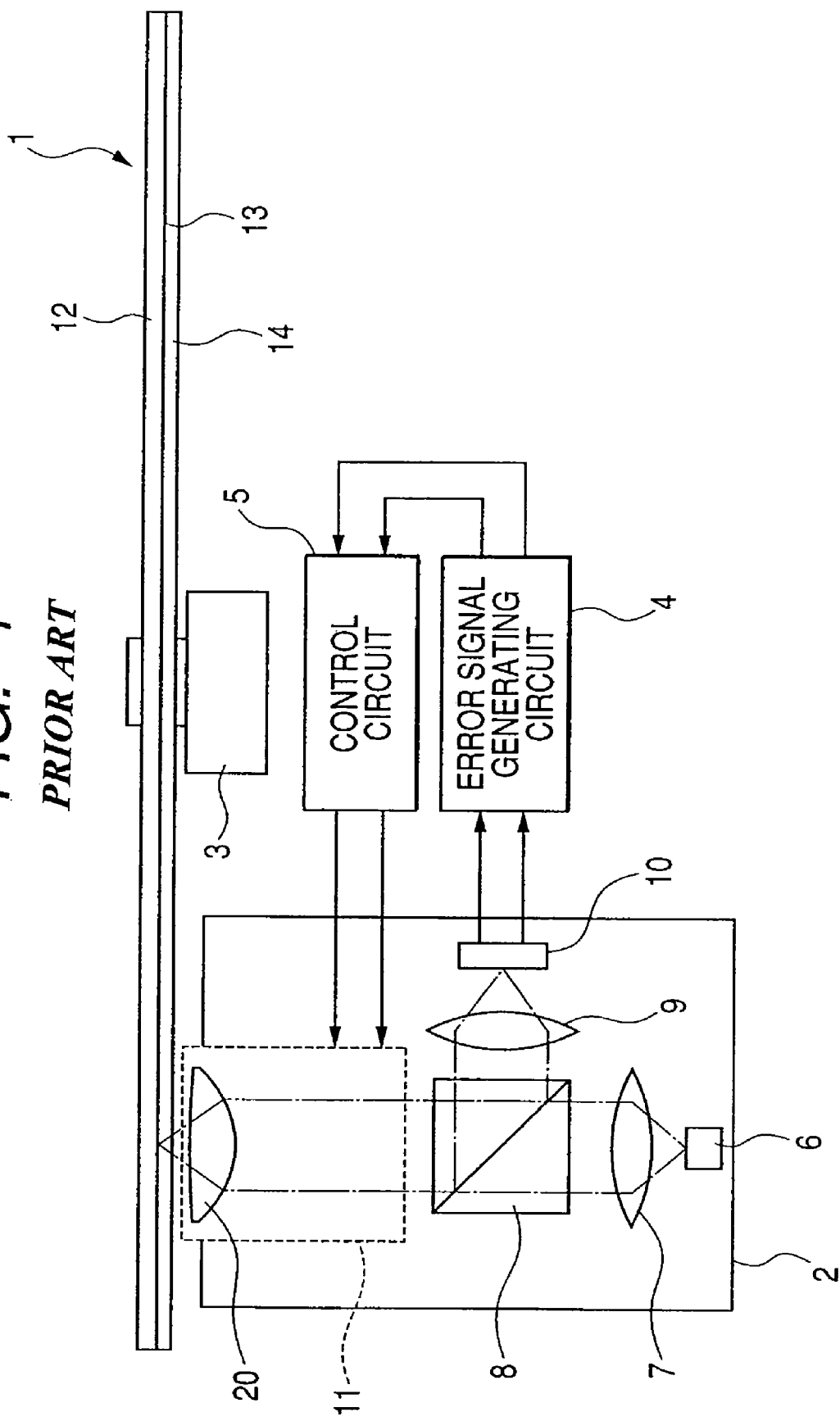
FIG. 4 schematically illustrates a constitution of an optical disk apparatus.

The optical disk apparatus, as shown in FIG. 4, has error-signal generating circuit 4 and control circuit 5 for performing focusing and tracking by actuator 11. Control circuit 5 applies an electrical current for performing control through elastic supporting members 24a, 24b, 24c, 24d to focusing coil 21 and tracking coil 22.

In the above optical disk apparatus, since the gap (working distance) between objective lens 20 and the surface cover layer 14 is as small as 0.2-0.6 mm, a stopper, or a like mechanism, cannot be provided at a position in the gap to limit the displacement of movable part 16, to prevent undesired contact of objective lens 20 with cover layer 14. Naturally, the actuator normally working for the control will keep constant the gap between objective lens 20 and the surface of cover layer 14. However, an actuator may fail in the control, owing to an abrupt impact, vibration, or a like cause, or owing to an adverse effect of dirt or a scratch on optical disk 1, so that a normal error signal will not be produced.

When movable part 16 comes to be displaced excessively toward optical disk 1 in such an abnormal working state, protecting member 25 protruding higher than objective lens 20 is brought into contact with cover layer 14 of optical disk 1 to protect objective lens 20 and to prevent scratches from being formed on cover layer 14. To prevent a serious adverse effect on the reliability of optical head 2 or optical disk 1, protecting member 25 is formed from a slidable material and cover layer 14 is formed from a hard material, and immediately after detection of abnormal working, movable part 16 is withdrawn once away from optical disk 1 and later, the control is restarted. Thereby, the contact between protecting member 25 and optical disk 1 is limited to be instantaneous, not seriously affecting the reliability of optical head 2 and optical disk 1.

Figure 2:
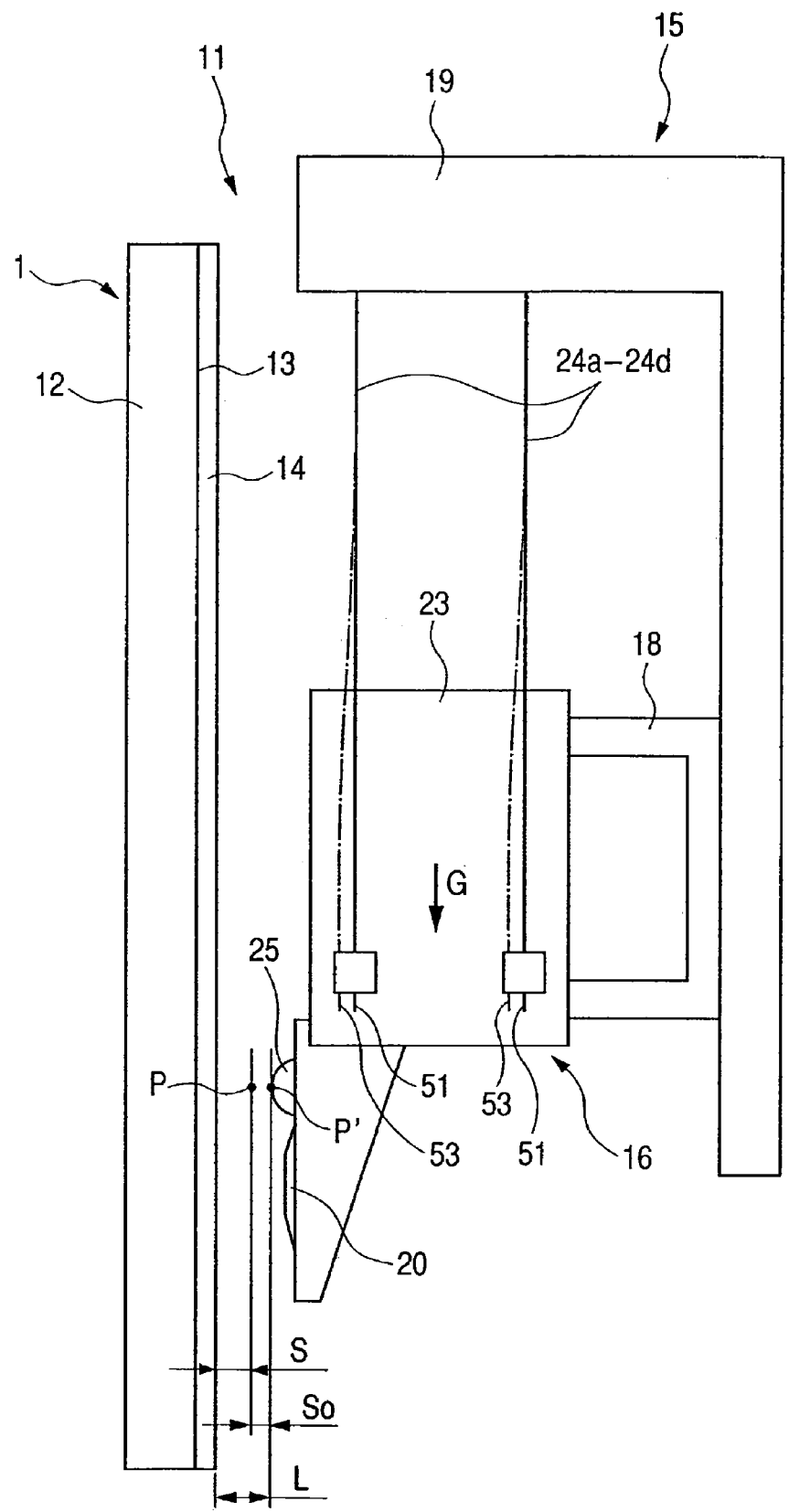
FIG. 2 is a drawing for explaining the working of the optical disk of the present invention, placed in a vertical direction.

FIG. 2 is a side view of actuator 11 and optical disk 1 of an optical disk apparatus of the present invention, with an optical disk set vertically. In this placement direction, gravity acts parallel to elastic supporting members 24a, 24b, 24c, 24d as indicated by arrow mark G, so that the elastic supporting members 24a, 24b, 24c, 24d are not bent by gravity acting on movable part 16, namely, the weight thereof. This placement state, in which the elastic supporting members are not bent by gravity, is hereinafter referred to as a "non-gravitational placement state". When actuator 11 is not working (hereinafter, referred to as a "neutral state") in the non-gravitational placement state, for example, the power source of the apparatus is turned off, or elastic supporting members 24a, 24b, 24c, 24d keep the position as shown by solid lines 51, without elastic deformation. Here, the position of the top of protecting member 25 in the neutral state is denoted by a symbol P'. By operation of actuator 11 for performing focusing control, elastic supporting members 24a, 24b, 24c, 24d are elastically deformed, as shown by one-dot chain lines 53, to displace movable part 16 toward optical disk 1 by a distance $S_0$ from the neutral state. The focus-controlled state by actuator 11 is hereinafter referred to as a "controlled state". The position of the top of protecting member 25 in the controlled state is denoted by a symbol P. The distance between position P' of the protecting member in the neutral state and position P thereof in the controlled state is referred to as a "withdrawal distance" of protecting member 25. In the controlled state, the distance between position P of the top of protecting member 25 and cover layer 14 (hereinafter, referred to as a "non-contact interval") is kept invariable at a constant interval S. Thus, movable part 16 is installed such that position P' of the top of protecting member 25 is apart from optical disk 1 more than a position P thereof, at the neutral state by withdrawal distance $S_0$. Therefore, in the non-gravitational placement in the neutral state, the interval L between the top of protecting member 25 and cover layer 14 (hereinafter, referred to as a "neutral state interval") is a sum of the non-contact interval S and withdrawal distance $S_0$:

$$L=S+S_0.$$

Figure 3:
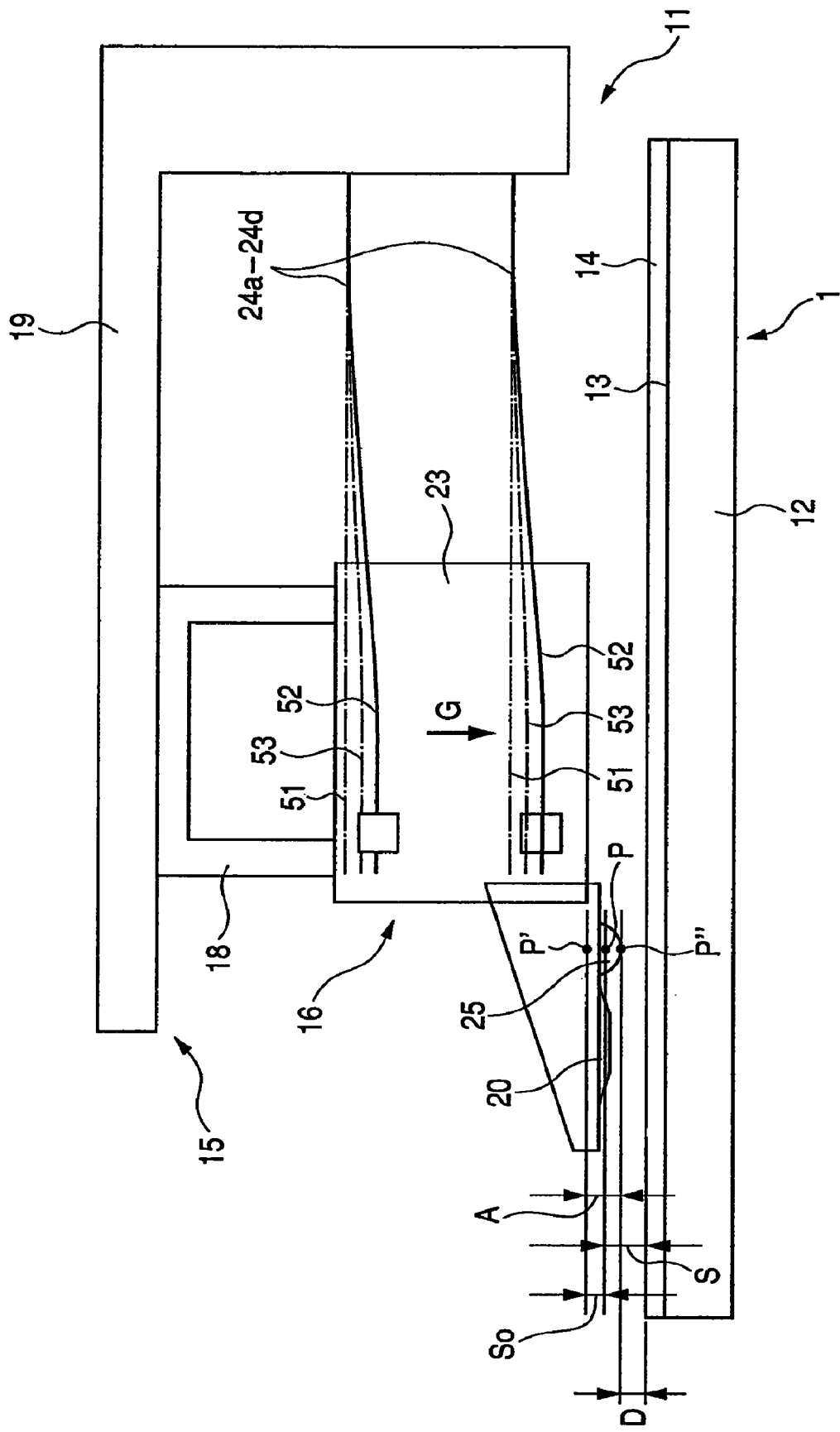
FIG. 3 is a drawing for explaining the working of the optical disk of the present invention, placed in a horizontal direction.
Figure 6:
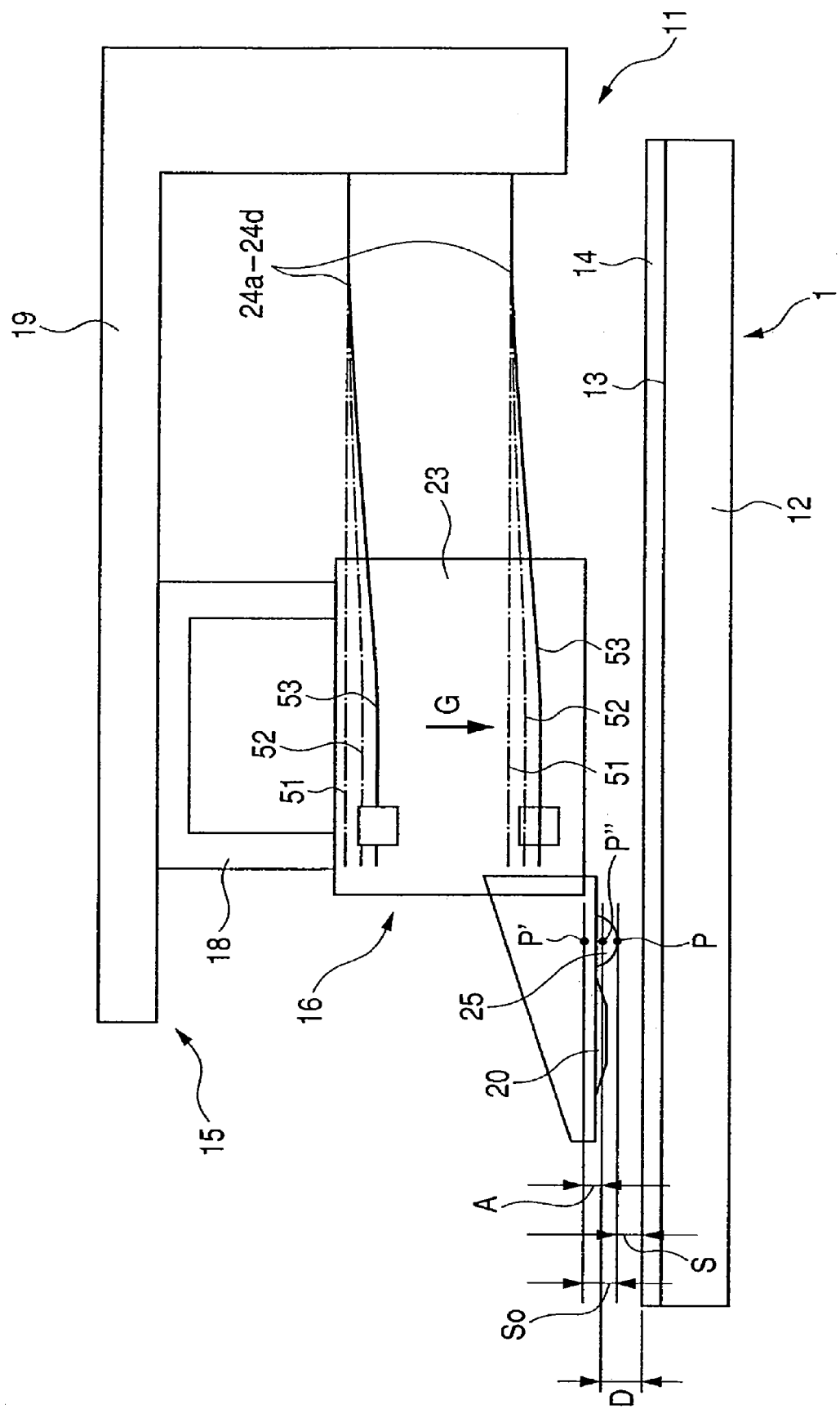
FIG. 6 is a drawing for explaining the working of an optical disk of the present invention, placed in another horizontal direction.

FIGS. 3 and 6 are side views of actuator 11 and optical disk 1 of an optical disk apparatus of the present invention with optical disk 1 placed horizontally and optical head 2 placed above the disk, respectively. In this placement direction, gravity acts perpendicularly on elastic supporting members 24a, 24b, 24c, and 24d, as indicated by arrow mark G. In this placement direction, in a neutral state, elastic supporting members 24a, 24b, 24c, 24d are bent by gravity acting on movable part 16, namely, the weight thereof, toward optical disk 1 from the position in the non-gravitated non-gravitational placement in the neutral state, as shown by one-dot chain line 51 toward optical disk 1, as shown by solid line 52. The placement state of the optical disk apparatus in which the elastic supporting member is bent by gravity is referred to as a "gravitational placement state". The position of the top of protecting member 25 in the neutral state in the gravitational placement state is indicated by a symbol P'". In this gravitational placement state, by performing focusing control by actuator 11, movable part 16 is driven to cause elastic deformation of 24a, 24b, 24c, and 24d, as shown by one-dot chain lines and continuous line 51 to 53 in FIGS. 3 and 6, to keep constant, the non-contact interval S between position P of the top of protecting member 25 and cover layer 14. The degree of bending (hereinafter, referred to as a "displacement distance") of protecting member 25 by gravity from the position P' in the neutral and non-gravitational placement state is indicated by a symbol A. Then, the neutral state distance D in the neutral state in the gravitational placement state is equal to non-contact interval S, plus withdrawal distance $S_0$, minus displacement distance A:

$$D=S+S_0-A.$$

Actually, in any placement state, in the neutral state, the relative interval between the top of protecting member 25 and cover layer 14 is variable around the designed dimension owing to warpage and thickness error of optical disk 1, variation of setting position of the optical head, or other causes. In consideration of a possible maximum deviation Sv toward the optical disk (or the cover layer) by variable factors, the minimum value $L_{min}$ of the neutral state interval L in the non-gravitational placement state is represented by the equation below:

$$L_{min} = S - S_v + S_0,$$

and the minimum value $D_{min}$ of the neutral state interval in the gravitational condition is represented by the equation below:

$$D_{min} = S - S_v + S_0 - A.$$

In the case wherein the deviation A is larger than the minimum ($L_{min} = S - S_v + S_0$) at the neutral state under a non-gravitational condition, the protecting member 25 is kept in contact with cover layer 14. Therefore, to prevent the contact of protecting member 25 with cover layer 14, $L_{min}$ should be larger than A:

$$D_{min} = S - S_v + S_0 - A > 0. \qquad (1)$$

The non-contact distance S in the controlled state is necessarily short, as the result of shortening of the focal distance resulting from an increase of NA of objective lens 20. On the other hand, the decrease $S_v$ of the interval results from a variation in production of the optical disk and apparatus, and other variable factors, so that the reduction thereof is limited. Therefore, in the present invention, withdrawal distance $S_0$ and displacement distance A are suitably designed to satisfy the above equation (1). The above matter is explained more specifically by reference to the Examples discussed below.

The withdrawal of movable part 16 in the neutral state is conducted without employing a driving means requiring electricity. Therefore, the movable part 16 is withdrawn surely in a power turn-off state of the optical apparatus.

The above matter is explained below more specifically by reference to the following Examples.

Example 1

In the apparatus of this Example, the laser beam has a wavelength of 405 nm; objective lens 20 has an NA of 0.85; cover layer 14 of optical disk 1 has a thickness of 0.1 mm; the interval between the surface of cover layer 14 and objective lens 20 (working distance) is 0.3 mm at focusing of the laser beam on information signal recording layer 13; protecting member 25 protrudes higher than objective lens 20 by 0.05 mm; and the interval between position P of the top of protecting member 25 and cover layer 14, namely, the non-contact interval S, is 0.25 mm during focusing control with the actuator, namely, in the controlled state.

Movable part 16 of optical head 2 has a mass of 270 mg. The total of the spring constants of elastic supporting members 24a, 24b, 24c, 24d is 19 N/m. Displacement distance A is 0.14 mm with optical disk 1 placed horizontally.

At the neutral state, the maximum deviation $S_v$ to cause a decrease of the relative interval between the top of protecting member 25 and cover layer 14 by various variation factors is 0.2 mm.

In this state, if the position of movable part 16 in the neutral state is the same as the controlled position, namely, $S_0=0$, the minimum $D_{min}$ of the interval between protecting member 25 and cover layer 14 is calculated as below:

$$D_{min} = S - S_v + S_0 - A$$
$$= 0.25 - 0.2 + 0 - 0.14$$
$$= 0.09 \text{(mm)}.$$

Therefore, the protecting member actually comes into contact with the cover layer.

In this Example, the protecting member is withdrawn by a withdrawal distance $S_0$ of 0.1 mm. Then, the minimum $D_{min}$ of the interval between protecting member 25 and cover layer 14 is calculated as below:

$$D_{min} = S - S_v + S_0 - A$$
$$= 0.25 - 0.2 + 0.1 - 0.14$$
$$= 0.01 \text{(mm)}.$$

Thus, the relation of the above Equation (1) is satisfied. As the result, even when elastic supporting members 24a, 24b, 24c, 24d are kept bending toward optical disk 1 by gravity of movable part 16, protecting member 25 does not come into contact with cover layer 14.

Example 2

In this Example also, cover layer 14 of optical disk 1 has a thickness of 0.1 mm; the laser beam has a wavelength of 405 nm; objective lens 20 has an NA of 0.85; the interval between the surface of cover layer 14 and objective lens 20 (working distance) is 0.3 mm at focusing of the laser beam on information signal recording layer 13; protecting member 25 protrudes more than objective lens 20 by 0.05 mm; and non-contact interval S is 0.25 mm in the controlled state.

Movable part 16 of optical head 2 has a mass of 230 mg, which is less than that in Example 1. The total of the spring constants of elastic supporting members 24a, 24b, 24c, and 24d is 56 N/m, which is more than that in Example 1. Displacement distance A is decreased to 0.4 mm with the optical disk placed horizontally.

At the neutral state, the maximum deviation $S_v$ to cause a decrease of the relative interval between the top of protecting member 25 and cover layer 14 by various variation factors, is 0.2 mm.

The decrease of the mass of movable part 16 and the increase of the spring constant of elastic supporting member 24a, 24b, 24c, 24d enables a sufficient decrease of the displacement distance A. Thereby, without withdrawal of movable part 16 in the neutral state from the controlled position ($S_0=0$), the minimum $D_{min}$ of the interval between protecting member 24 and cover layer 14 is calculated as below:

$$D_{min} = S - S_v + S_0 - A$$
$$= 0.25 - 0.2 + 0 - 0.04$$
$$= 0.01 \text{(mm)}.$$

Thus, the relation of the above Equation (1) is satisfied. As the result, even when elastic supporting members 24a, 24b, 24c, and 24d are bent toward optical disk 1 by gravity acting on movable part 16, the protecting member 25 does not come into contact with cover layer 14.

In the above embodiments explained above, protecting member 25 is formed as a part of lens-holding member 23, but it is not limited thereto. Protecting member 25 may be formed at any position of movable part 16 driven together with objective lens 20, or on objective lens 20, itself. For example, protecting member 25 may be formed from a transparent glass or a plastic material, to protrude from objective lens 20 in integration. In this case, protecting member 25 preferably has a surface film constituted of a material having high slidability, not to cause damage to objective lens 20 and cover layer 14 on contact with optical disk 1.

What is claimed is:

1. An optical disk apparatus comprising:
a lens holding member for holding an objective lens for focusing a laser beam onto an optical disk;
a protecting member, located on the lens holding member, for preventing contact of the objective lens with the optical disk, the protecting member being spaced apart from the optical disk;
an elastic supporting member for supporting the lens holding member, the elastic supporting member holding the lens holding member to be movable in vertical and radial directions relative to the optical axis; and
an actuator for driving the lens holding member toward or away from the optical disk,
wherein a spring constant of the elastic supporting member is set so as to maintain a space between the protecting member and the optical disk, even when the elastic supporting member is bent by gravity, such that the lens holding member is moved toward the optical disk.

* * * * *